United States Patent
Nishiyama

(10) Patent No.: US 7,889,366 B2
(45) Date of Patent: Feb. 15, 2011

(54) IMAGE FORMING DEVICE, IMAGE FORMING METHOD, AND IMAGE PROCESSING SYSTEM

(75) Inventor: Junichi Nishiyama, Atsugi (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 1392 days.

(21) Appl. No.: 11/047,657

(22) Filed: Feb. 2, 2005

(65) Prior Publication Data

US 2006/0028530 A1   Feb. 9, 2006

(30) Foreign Application Priority Data

Aug. 5, 2004   (JP)   ............... 2004-229586

(51) Int. Cl.
G06K 15/00   (2006.01)
G06F 7/04   (2006.01)

(52) U.S. Cl. .............. 358/1.14; 358/1.15; 726/4; 726/5; 726/6; 726/7; 726/21; 713/161; 713/171

(58) Field of Classification Search .......... 358/1.15, 358/1.1, 1.14; 726/17, 19; 713/161, 171
See application file for complete search history.

(56) References Cited

U.S. PATENT DOCUMENTS

| | | | | |
|---|---|---|---|---|
| 5,673,373 A * | 9/1997 | Nosaki et al. | ............... | 358/1.15 |
| 5,970,218 A * | 10/1999 | Mullin et al. | ............... | 358/1.15 |
| 6,463,229 B2 * | 10/2002 | Takuwa et al. | ............... | 399/82 |
| 6,545,767 B1 * | 4/2003 | Kuroyanagi | ............... | 358/1.14 |
| 6,711,677 B1 * | 3/2004 | Wiegley | ............... | 713/151 |
| 7,283,259 B2 * | 10/2007 | Iwasaki | ............... | 358/1.14 |
| 7,298,505 B2 * | 11/2007 | Ueda | ............... | 358/1.14 |
| 7,305,556 B2 * | 12/2007 | Slick et al. | ............... | 713/169 |
| 7,433,067 B2 * | 10/2008 | Nonoyama et al. | ............... | 358/1.15 |
| 7,511,842 B2 * | 3/2009 | Mihira | ............... | 358/1.15 |
| 7,587,468 B2 * | 9/2009 | Tenenbaum | ............... | 709/217 |
| 2002/0036790 A1 * | 3/2002 | Nishiyama | ............... | 358/1.14 |
| 2003/0044009 A1 * | 3/2003 | Dathathraya | ............... | 380/55 |
| 2005/0046876 A1 * | 3/2005 | Burget et al. | ............... | 358/1.1 |
| 2005/0105121 A1 * | 5/2005 | Hirano | ............... | 358/1.14 |
| 2005/0219610 A1 * | 10/2005 | Kimura et al. | ............... | 358/1.15 |
| 2007/0038872 A1 * | 2/2007 | Bridges et al. | ............... | 713/193 |

FOREIGN PATENT DOCUMENTS

| | | |
|---|---|---|
| JP | 7-276744 | 10/1995 |
| JP | 9-237170 | 9/1997 |

OTHER PUBLICATIONS

Morino Shigeru, Printing Device, Sep. 9, 1997, JP 09-237170, English Translation.*

* cited by examiner

Primary Examiner—Twyler L Haskins
Assistant Examiner—Dennis Dicker
(74) Attorney, Agent, or Firm—Buchanan Ingersoll & Rooney PC

(57) ABSTRACT

A printer as an image forming device establishes the same password for multiple confidential printing jobs received within a specified time period from the same user and sends them back to the source of the transmission. The printer approves the execution of the particular confidential printing job when the entered password matches with the password established for the confidential printing job.

24 Claims, 14 Drawing Sheets

| | 531 | 532 | 533 |
|---|---|---|---|
| 53 | USER NAME | PASSWORD | REGISTRATION TIME |
| | USER A | 1234 | 10:00 |
| | USER B | 5678 | 10:30 |
| | USER C | 9999 | 11:00 |
| | ... | | |

| USER NAME | PASSWORD | REGISTRATION TIME |
|---|---|---|
| USER A | 1234 | 10:00 |
| USER B | 5678 | 10:01 |
| ... | | |

| | 591 USER NAME | 592 USER'S SIDE PASSWORD | 593 PRINTER'S SIDE PASSWORD | 594 REGISTRATION TIME |
|---|---|---|---|---|
| 59 | USER A | 1234 | 12345678 | 10:00 |
| | USER B | 1234 | 12340123 | 10:02 |
| | USER C | 9999 | 99991111 | 10:03 |
| | ... | | | |

Please enter password generated by printer adding coded to password entered at PC (printer's side password).

Please enter password entered at PC (user's side password).

IMAGE FORMING DEVICE, IMAGE FORMING METHOD, AND IMAGE PROCESSING SYSTEM

This application is based on Japanese Patent Application No. 2004-229586 filed on Aug. 5, 2004, the contents of which are hereby incorporated by reference.

BACKGROUND OF THE INVENTION

1. Field of the Invention

The present invention relates to an image forming device, an image forming method, and an image processing system. The present invention, in particular, relates to an image forming device, an image forming method, and an image processing system capable of confidential printing.

2. Description of the Related Art

In a printing system where a personal computer ("PC") and a printer are connected on a network such as a LAN, the PC can transmit printing jobs to the printer via the network to be printed by the printer.

However, there are cases that are not desirable from the standpoint of keeping confidentiality of a printed matter as the printed matter can be exposed to the eyes of third parties between the time when the user instructs the transmission of a printing job from the PC and the time when the user receives the printed matter at the printer.

As a means of solving this problem, a technology is proposed (Unexamined Publication No. JP-A-276744) in which the PC transmits a printing job after setting up a password specified by the user, and the printer executes the printing job only when the password is entered on the printer.

Also, a technology is proposed (Unexamined Publication No. JP-A-9237170) in which the printer generates a password for each printing job it receives, returns the password to the PC, and executes the printing job only when the password is entered on the printer.

However, the method described in the Unexamined Publication No. JP-A-276744 presents a problem that a password specified by a user can match with a password specified by another user, thus damaging the confidentiality of the printed matter.

Also, the method described in the Unexamined Publication No. JP-A-9237170 presents a problem that a user has to remember all the passwords generated by the printer if there is a plurality of printing jobs for the same user, thus causing a large burden on the user affecting the user's convenience.

SUMMARY OF THE INVENTION

It is an object of the present invention to provide an image forming device, an image forming method, and an image processing system, which are improved for solving the above-mentioned problems.

It is a more specific object of the invention to provide an image forming device, an image forming method, and an image processing system, which can protect the confidentiality of a printed matter without affecting the user's convenience.

According to an aspect of the invention, there is provided an image forming device, comprising: a receiving unit for receiving a first confidential printing job; a first judging unit for judging whether a second confidential printing job by the user related to said first confidential printing job has been received before or not; and an establishing unit for establishing a password for said first confidential printing job same as the one that has been established for said second confidential printing job, when said second confidential printing job has been received.

In executing confidential printing jobs, the present invention reduces the burden on the user without affecting the user's convenience and maintains the confidentiality of a printed matter.

According to another aspect of the invention, there is provided an image forming device, comprising: a receiving unit for receiving a first confidential printing job; an establishing unit for establishing a first password for said first confidential printing job; a returning unit for returning the established first password to said first confidential print job's sender; a first judging unit for judging whether a second confidential printing job by the user related to said first confidential printing job has been received before or not; a second judgment unit for judging whether the input password matches with the second password established for said second confidential printing job or not, when said second confidential printing job has been received; and an approving unit for approving the execution of said first confidential printing job if said input password matches with the second password.

According to still another aspect of the invention, there is provided an image forming device, comprising: a receiving unit for receiving a confidential printing job containing a user's side password specified by a user; a storage unit for storing a user's side password contained in said confidential printing job; an establishing unit for establishing a printer's side password for said confidential printing job different from said user's side password; a first judging unit for judging whether another confidential printing job has been received before or not, said another confidential printing job being by a user different from the user related to the received confidential printing job and containing a user's side password same as the one contained in the received confidential printing job; a second judging unit for judging whether the input password matches with said printer's side password or not, when said another confidential printing job has been received; and an approving unit for approving the execution of said confidential printing job if said input password matches with said printer's side password.

According to a further aspect of the invention, there is provided an image forming method comprising the steps of: 1) receiving a first confidential printing job; 2) judging whether a second confidential printing job by the user related to said first confidential printing job has been received before or not; 3) establishing a password for said first confidential printing job same as the one that has been established for said second confidential printing job, when said second job has been received; 4) returning the established password to said first print job's sender; 5) judging whether the input password matches with the password established for said first confidential printing job; and 6) approving the execution of said first confidential printing job if said input password matches with the password established for said first confidential printing job.

According to a still further aspect of the invention, there is provided An image forming method comprising the steps of: 1) receiving a first confidential printing job; 2) establishing a first password for said first confidential printing job; 3) returning the established first password to said first print job's sender; 4) judging whether a second confidential printing job by the user related to said first confidential printing job has been received before or not; 5) judging whether the input password matches with the second password established for said second confidential printing job or not, when said second confidential printing job has been received; and 6) approving the execution of said first confidential printing job if said input password matches with the second password.

According to a yet further aspect of the invention, there is provided an image forming method comprising the steps of: 1) receiving a confidential printing job containing a user's side password specified by a user; 2) storing a user's side password contained in said confidential printing job; 3) establishing a printer's side password for said confidential printing job different from said user's side password; 4) returning the established printer's side password to said confidential printing job's sender; 5) judging whether another confidential printing job has been received before or not, said another confidential printing job being by a user different from the user related to the received confidential printing job and containing a user's side password same as the one contained in the received confidential printing job; 6) judging whether the input password matches with said printer's side password or not, when said another confidential printing job has been received; 7) approving the execution of said confidential printing job if said input password matches with said printer's side password.

The objects, characteristics and properties of this invention other than those set forth above will become apparent from the description given herein below with reference to preferred embodiments illustrated in the accompanying drawings.

BRIEF DESCRIPTION OF THE DRAWINGS

FIG. 14 is a diagram showing an example of a list of passwords.

FIG. 20 is a diagram showing an example of a list of passwords.

FIG. 22 is a diagram showing a password entry screen prompting an input of the printer's side password.

FIG. 23 is a diagram showing a password entry screen prompting an input of the user's side password.

DETAILED DESCRIPTION OF THE INVENTION

The embodiments of this invention will be described below with reference to the accompanying drawings.

Figure 1:
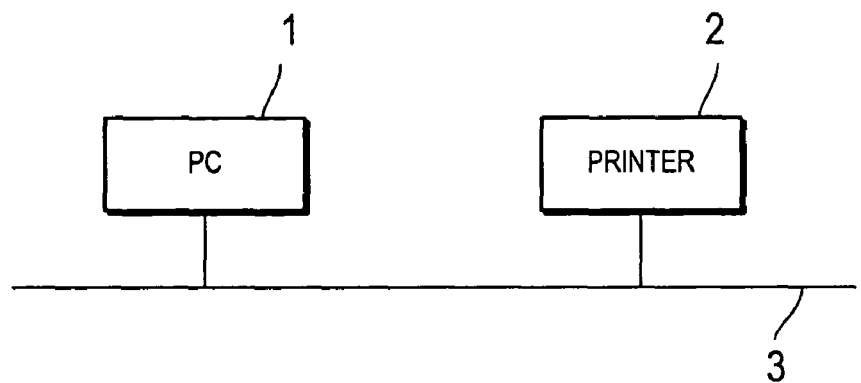
FIG. 1 is a block diagram showing the overall constitution of an image processing system according to the first embodiment of the present invention.

FIG. 1 is a block diagram showing the overall constitution of an image processing system according to the first embodiment of the present invention.

The image processing system according to this embodiment is equipped with a PC 1 as a printing job transmission device and a printer 2 as an image forming device, which are connected via a network 3 to communicate with each other. The types and the number of equipment to be connected to the network 3 are not limited to those shown in FIG. 1. Also, the PC 1 and the printer 2 can be connected directly (local connection) without recourse to network 3.

Figure 2:
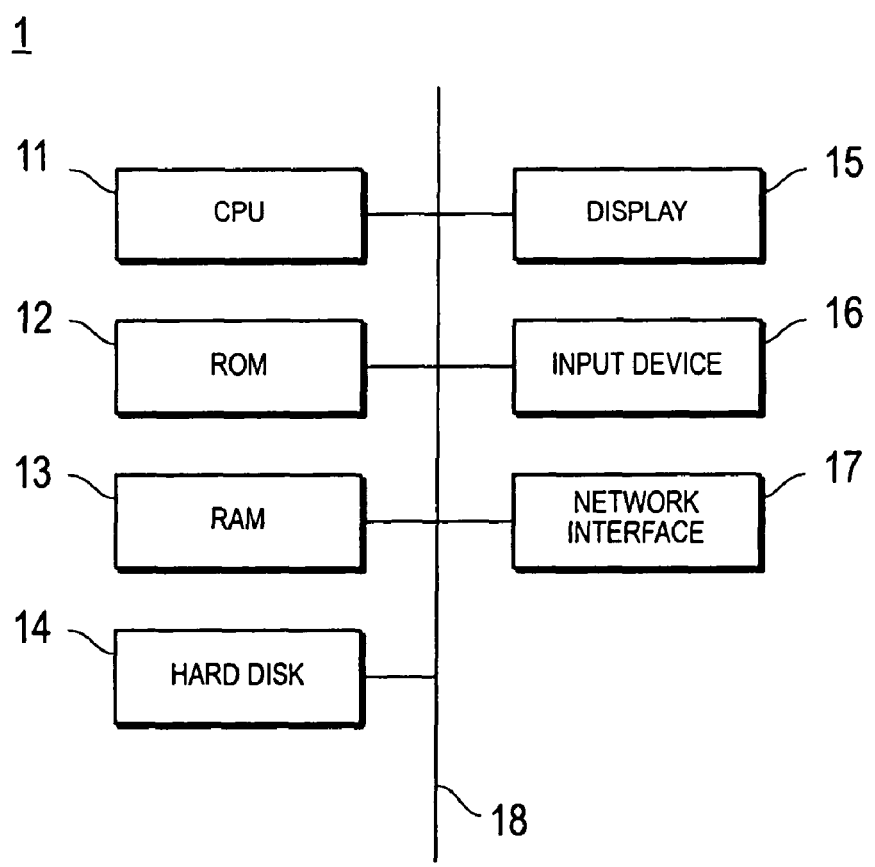
FIG. 2 is a block diagram showing the constitution of the PC shown in FIG. 1.

FIG. 2 is a block diagram showing the constitution of the PC shown in FIG. 1. The PC 1 contains a CPU 11, a ROM 12, a RAM 13, a hard disk 14, a display 15, an input device 16 and a network interface 17, all of which are interconnected by a bus 18 for exchanging signals.

The CPU 11 controls various parts indicated above and executes various arithmetic processes according to a program. The ROM 12 stores various programs and data. The RAM 13 stores programs and data temporarily as a working area. The hard disk 14 stores various programs including an operating system and data.

The hard disk 14 has an application program for generating document files and a printer driver for converting the document files into print data described in a language understood by the printer 2 installed.

Display 15 displays various kinds of information. Input device 16 consists of a pointing device such as a mouse, a keyboard, and others, and is used for making various kinds of inputs. The network interface 17 is an interface to connect with the network 3 for communicating with other devices on the network using standards such as Ethernet®, Token Ring, FDDI, etc.

Figure 3:
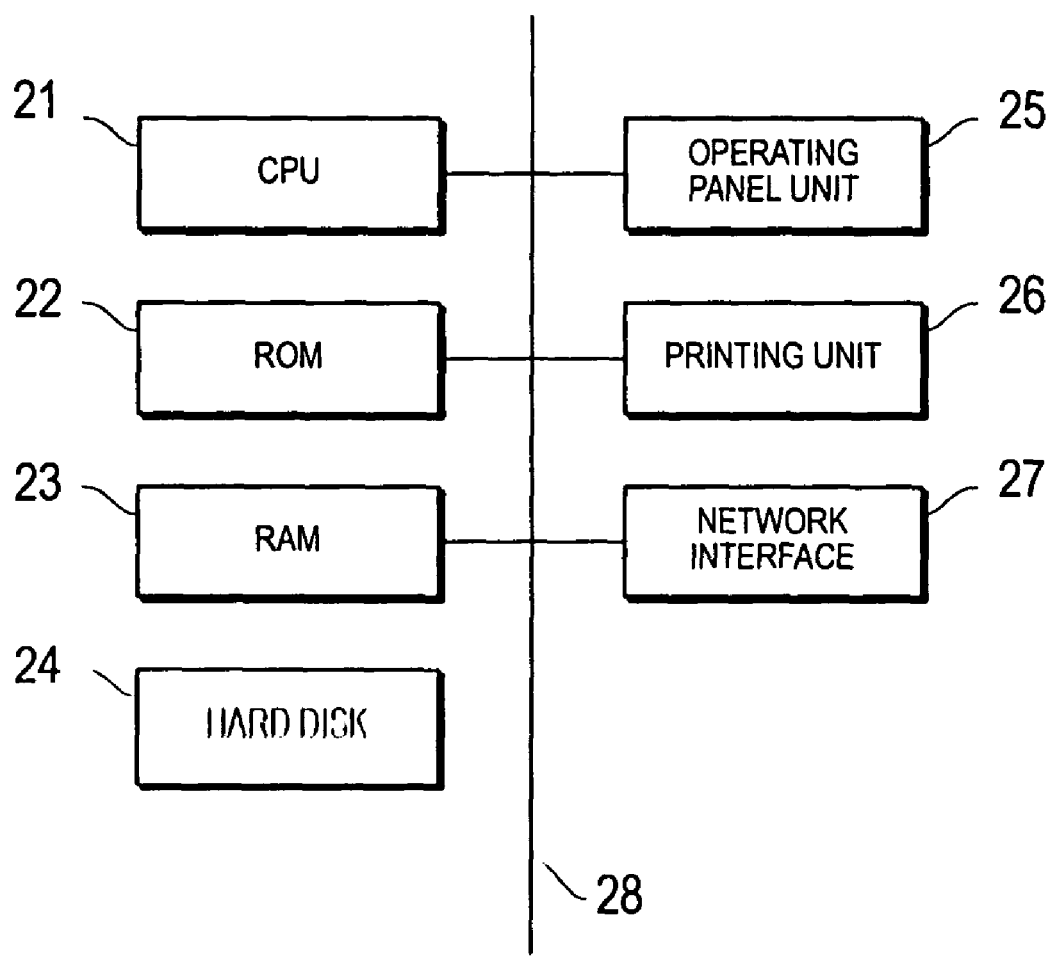
FIG. 3 is a block diagram showing the constitution of the printer shown in FIG. 1.

FIG. 3 is a block diagram showing the constitution of the printer shown in FIG. 1. The printer 2 has a CPU 21, a ROM 22, a RAM 23, a hard disk 24, an operating panel unit 25, a printing unit 26, and a network interface 27, all of which are interconnected with each other via a bus 28 for exchanging signals. The descriptions of those parts of the printer 2 that have the same functions as those of the corresponding parts of the PC 1 will be omitted here to avoid being duplicative.

The operating panel unit 25 is equipped with a touch panel, a ten-key pad, a start button, a stop button and others to be used for displaying various kinds of information and entering various instructions. The printing unit 26 prints various data on a recording medium such as paper using a known image forming process such as an electronic photography type process, The PC 1 and the printer 2 can each contain constitutional elements other than those described above, or may lack a portion of the abovementioned elements.

The network 3 can be a LAN connecting computers and network equipment according to standards such as Ethernet®, Token Ring, and FDDI, or a WAN that consists of several LANs connected by a dedicated line.

The operation of the image processing system in this embodiment will be described in the following.

Figure 4:
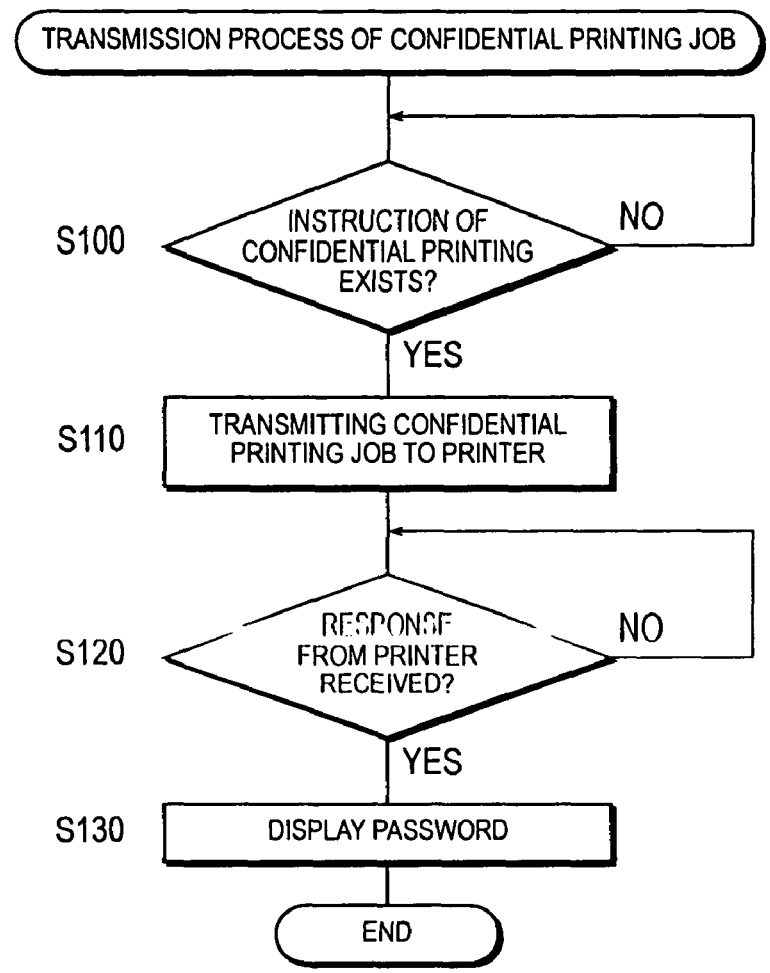
FIG. 4 is a flowchart showing the process sequence of the PC for transmitting a confidential printing job.

FIG. 4 is a flowchart showing the process sequence of the PC 1 for transmitting a confidential printing job. The algorithm shown in the flowchart of FIG. 4 is stored as a program in a storage unit such as the hard disk 14 of the PC 1 and executed by the CPU 11.

First, the PC 1 will stand by until it receives an instruction for confidential printing based on the user's operation (S100: No). The confidential printing instruction is issued for a document file generated by the application program.

Figure 5:
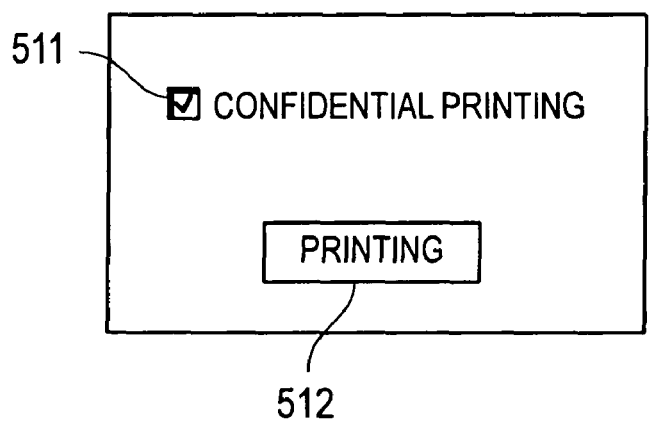
FIG. 5 is a diagram showing an example of a screen for instructing confidential printing.

FIG. 5 shows an example of a screen for instructing confidential printing. The confidential printing instruction is complete when a check box for confidential printing 511 is check-marked and a printing button 512 is pressed on a confidential printing instruction screen 51 displayed by the printer driver.

When the confidential printing instruction is made (S100: Yes), a confidential printing job is generated to include print data converted from a document file by the printer driver and said printing job is transmitted to the printer 2 (S110). A confidential printing job means a printing job that can be executed on the printer 2 only when a specified password is entered.

Next, the PC 1 stands by until it receives a response from the printer 2 (S120: No). Such a response includes a password for executing on the printer 2 the confidential printing job transmitted in the step S110.

Figure 6:
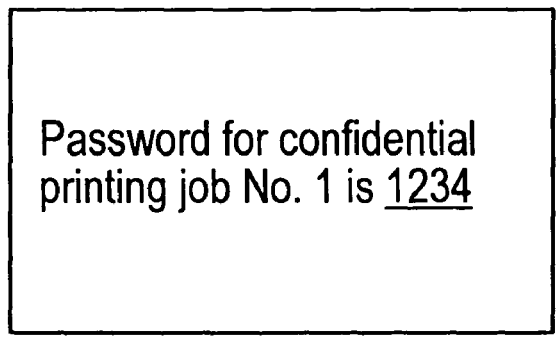
FIG. 6 is a diagram showing an example of a password display screen.

When a response is received from the printer 2 (S120: Yes), the PC 1 displays the password included in the received response on the display 15 (S130). FIG. 6 is a diagram showing an example of a password display screen 52.

Figure 7:
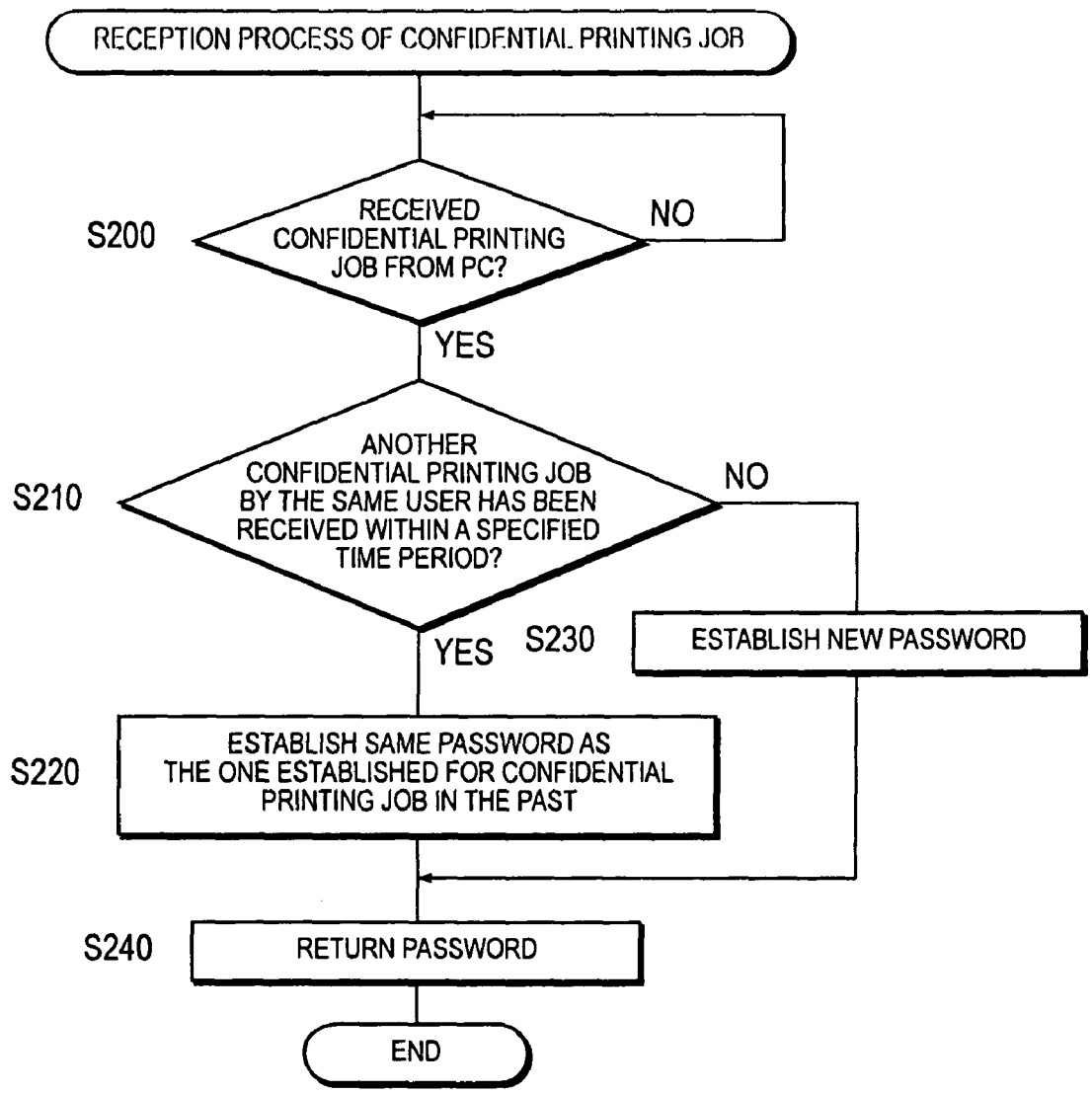
FIG. 7 is a flowchart showing the process sequence of the printer for receiving a confidential printing job.

FIG. 7 is a flowchart showing the process sequence of the printer 2 for receiving a confidential printing job. The algorithm shown in the flowchart of FIG. 7 is stored as a program in a storage unit such as the ROM 22 of the printer 2 and executed by the CPU 21 (the same things go with the algorithms shown in FIG. 9 and FIG. 10 which will be described later).

Next, the printer 2 stands by until it receives a confidential printing job from the PC 1 (S200: No).

When a confidential printing job is received from the PC 1 (S200: Yes), a judgment is made as to whether another confidential printing job by the user related to said received confidential printing job has been received or not within a specified time period in the past (S210). The specified time period can be set up, for example, to approximately one to three hours.

If another confidential printing job by the same user has been received within the specified time in the past (S210: Yes), the same password as the one set up for the past confidential printing job is established for the confidential printing job received in the step S200 (S220).

On the other hand, if another confidential printing job by the same user is not received within the specified time in the past (S210: No), a new password different from the one established for the past confidential printing job is established for the confidential printing job received in the step S200 (S230).

The password established in the step S220 or S230 is returned to the PC 1, which is the sender of the confidential printing job (S240).

Figures 8, 9:
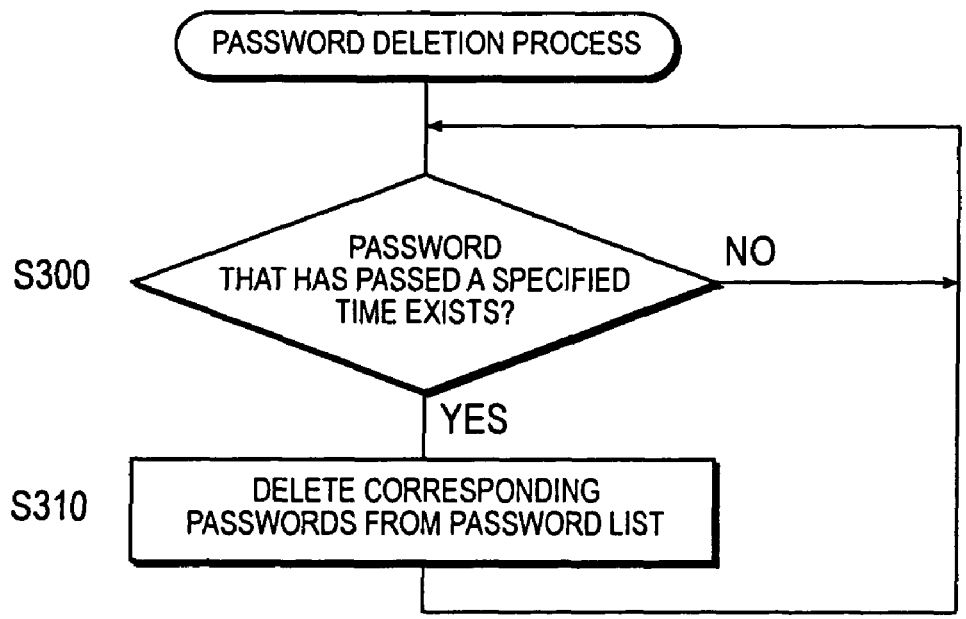
FIG. 8 is a diagram showing an example of a list of passwords.
FIG. 9 is a flowchart showing the process sequence of the printer for deleting a password.

The password thus established is stored in a storage unit of the printer 2, e.g., the hard disk 24, in a format of a password list. FIG. 8 shows an example of a password list 53. The password list 53 consists of a column 531 for listing the user names of the transmitters of confidential printing jobs, a column 532 for listing the passwords specified for the confidential printing jobs, and a column 533 for showing the registration times of the passwords. Registered passwords are deleted from the password list 53 after a certain period of time from the registration times. The judgment in the step S210 is executed by making a judgment whether the user concerning the confidential printing job received in the step S200 is a user who corresponds to the user name registered in the password list 53 or not. The password thus established can be stored to the password list 53 either before or after the return transmission of the password to the PC 1.

FIG. 9 is a flowchart showing the process sequence of the printer 2 for deleting a password.

First, a judgment is made as to whether a password that has passed a specified period after its registration exists in the password list 53 or not in the step S300. As long as the power switch (not shown) of the printer 2 is turned on, the judgment of the step S300 is continuously performed.

If the password that has passed the specified period after its registration exists (S300: Yes), the data concerning the password will be deleted from the password list 53 (S310).

Figures 10, 11:
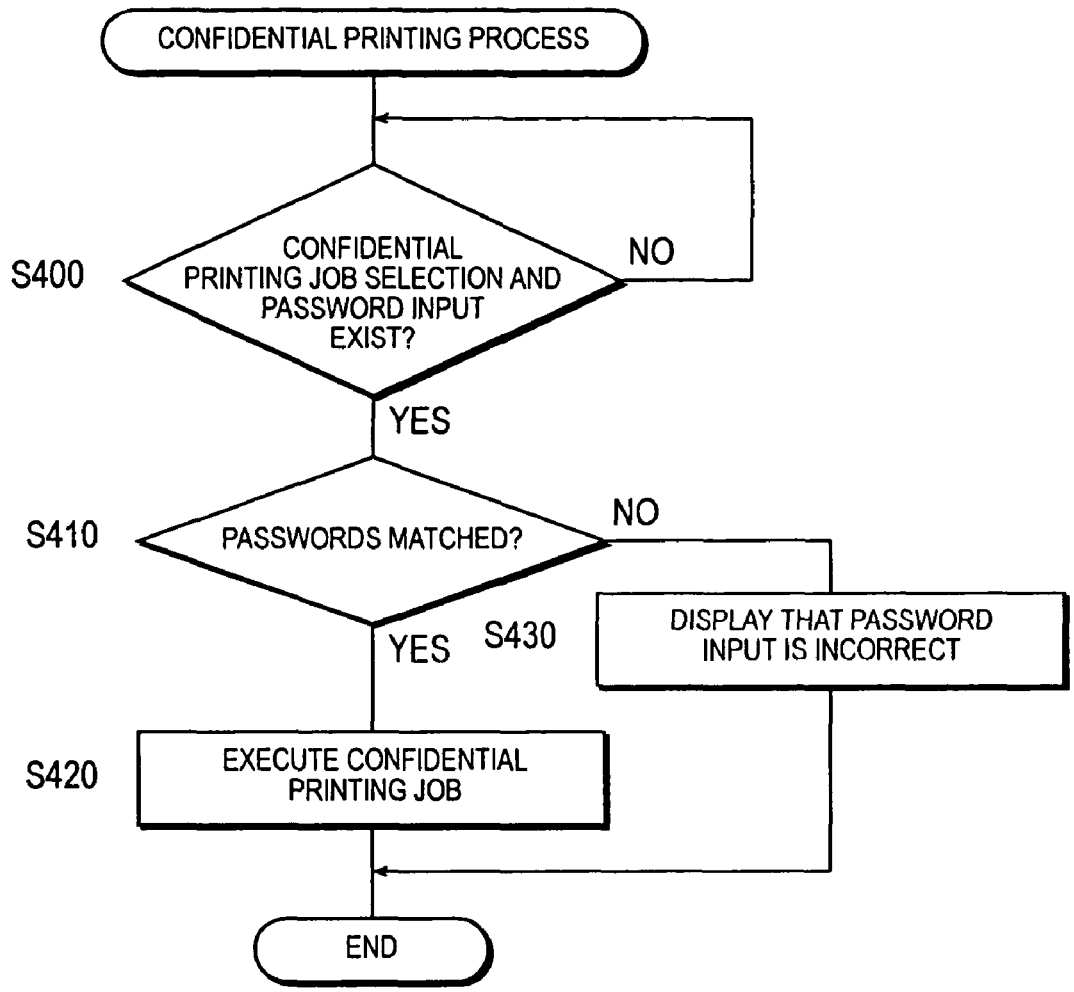
FIG. 10 is a flowchart showing the process sequence of the printer for confidential printing.
FIG. 11 is a diagram showing an example of a printing job selection screen.

FIG. 10 is a flowchart showing the process sequence of the printer 2 for confidential printing.

First, in the step S400, the printer 2 stands by until a confidential printing job is selected and a password is entered based on the user's operation (S400: No).

Figure 12:
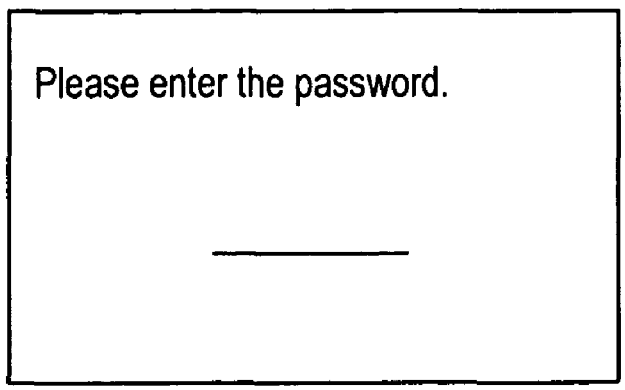
FIG. 12 is a diagram showing an example of a password entry screen.

FIG. 11 shows an example of a printing job selection screen 54 for selecting a printing job to be executed on the printer 2 from the job list, and FIG. 12 shows an example of a password entry screen 55 for prompting the input of the password established in the selected printing job. More specifically, the display switches to the password entry screen 55 when a confidential printing job to be executed is selected on the printing job selection screen 54 displayed on the operating panel unit 25. The user can enter the password using the ten-key pad and others on the operating panel unit 25.

When the job selection and the password entry are found for a confidential printing job (S400: Yes), a judgment is made as to whether the password established for the selected confidential printing job matches with the entered password or not (S410).

When the two passwords match with each other (S410: Yes), the selected confidential printing job is executed (S420). In other words, the printer 2 allows the confidential printing job to be executed, and the printing unit 26 executes printing based on the selected confidential printing job.

On the other hand, if the two passwords do not match (S410: No), the printer 2 disapproves the execution of the selected confidential printing job and causes the operating panel unit 25 to indicate that the entered password is incorrect (S430).

Next, let us describe a case wherein two confidential printing jobs are transmitted to the printer 2 from the PC 1 based on an instruction of confidential printing by the user A. Here we assume that the passwords registered in the password list 53 are maintained for two hours.

First, when the user A instructs a confidential printing at 10:00, the PC 1 transmits the first confidential printing job to the printer 2. The printer 2 receives the first confidential printing job from the PC 1. If the user A does not exist in the password list 53, the printer 2 sends a new password "1234" to the PC 1, and adds the new data consisting of the user name of the user A, the password of "1234," and the registration time of 10:00 to the password list 53. As the PC 1 receives the abovementioned response from the printer 2, it displays the password "1234" on the display 15. Furthermore, when the user A instructs another confidential printing at 10:01, the PC 1 transmits the second confidential printing job to the printer 2. The printer 2 receives the second confidential printing job from the PC 1. Since the user A already exists in the password list 53 at this point, the printer 2 responds the instruction received from the PC 1 with the already registered password "1234." As the PC 1 receives the abovementioned response from the printer 2, it displays the password "1234" on the display 15.

Then the user A walks up to the place where the printer 2 is installed, selects the first confidential printing job on the operating panel unit 25, and enters "1234" as the password. Because the password established for the selected first confidential job matches with the entered password, the printer 2 approves the execution of the first confidential printing job. Furthermore, the user A selects the second confidential printing job on the operating panel unit 25, and enters "1234" as the password. Because the password established in the selected second confidential job matches with the entered password, the printer 2 approves the execution of the second confidential printing job as well.

When the time comes to 12 o'clock, noting that one of the passwords has passed the specified time after its registration, the printer 2 deletes the data consisting of the user name of the user A, the password of "1234," and the registration time of 10:00 from the password list 53. Therefore, when the user A instructs confidential printing again after this, a new password such as "9876," which is different from "1234," will be established.

As can be seen from the above, the printer 2 establishes the same password for multiple confidential printing jobs received within a specified time period from the same user and returns them back to the sender.

Therefore, the user is required to remember only one password assigned for the multiple confidential printing jobs so that it is possible to minimize the problem of forgetting passwords and being unable to print. Moreover, it is possible to maintain the confidentiality of printed matters because different passwords are established for confidential printing jobs of different users.

Although it is shown in the above that the password is entered on the password entry screen 55 after the job is selected on the printing job selection screen 54 when a confidential printing job is to be executed on the printer 2 as shown in FIG. 11 and FIG. 12, the present invention is not limited to it. In other words, it can be constituted in such a way as to execute a confidential printing job that corresponds to the entered password by simply entering the password in the password entry screen 55 without displaying the printing job selection screen 54.

Moreover, although the registration time on the password list 53 is defined in the above as the time when the first confidential printing job is entered, the present invention is not limited to it. The registration time on the password list 53 can be updated, for example, when the same user enters the second confidential printing job. By constituting this way, it is more convenient for the user who instructs confidential printing repeatedly in a sequence because the time period, for which the same password is assigned, can be extended.

Moreover, although the data registered on the password list 53 including the password will be deleted when a specified time period has passed after the registration of said data, the present invention is not limited to it. It can be so constituted as to leave the registered data on the password list 53 after the specified time has passed, and let the system judge whether there are any other confidential printing jobs by the same user exist whose registration times are within a specified time period based on the time difference between now and then. By constituting this way, it is possible to prevent the same password from being established again even after a specified time period has passed since the data was registered. Therefore, it provides an advantage that it eliminates the possibility of establishing the same password for confidential printing jobs of a different user.

Next, an image processing system according to the second embodiment of the invention will be described below. The hardware constitution of this embodiment is similar to that of the image processing system according to the first embodiment shown in FIG. 1 through FIG. 3, so that its description is not repeated here. The following description of the image processing system operation according to the second embodiment therefore focuses on those points which are different from the first embodiment.

The process sequence of transmitting a confidential printing job from the PC 1 is not repeated here as it is identical to that described in the first embodiments with reference to FIG. 4.

Figure 13:
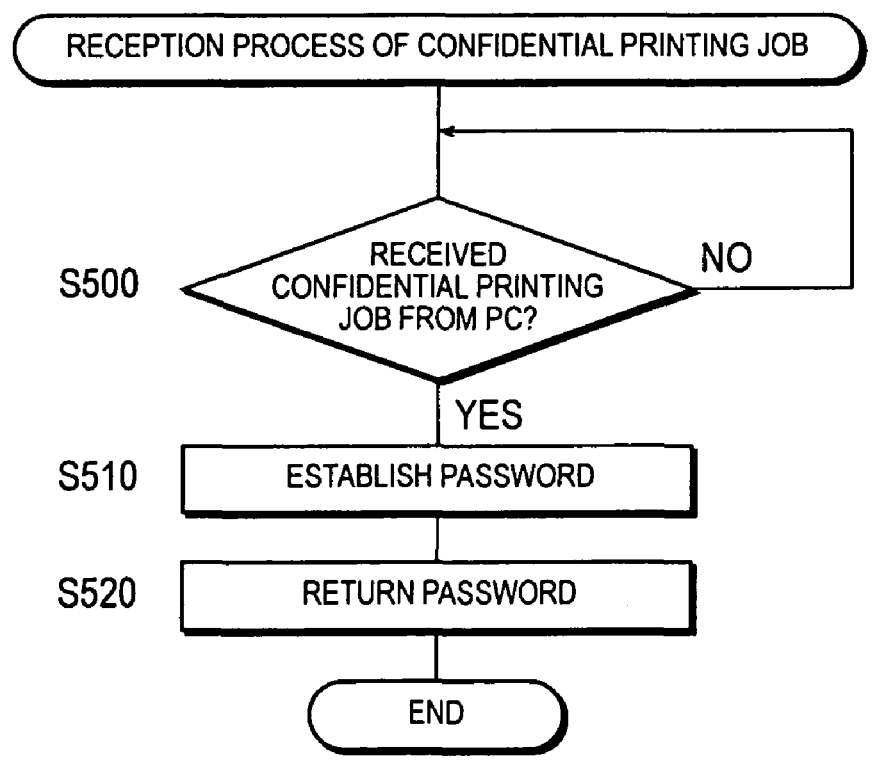
FIG. 13 is a flowchart showing the process sequence of the printer for receiving a confidential printing job in the second embodiment.

FIG. 13 is a flowchart showing the process sequence of the printer 2 for receiving a confidential printing job. The algorithm shown in the flowchart of FIG. 13 is stored as a program in a storage unit such as the ROM 22 of the printer 2 and executed by the CPU 21 (the same thing goes with the algorithm shown in FIG. 15 which will be described later).

In the step S500, the printer 2 stands by until it receives a confidential printing job from the PC 1 (S500: No).

When a confidential printing job is received from the PC 1 (S500: Yes), a new password, which is different from the already registered one, will be established for the particular confidential printing job (S510).

Next, the established password is returned to the PC 1, which is the sender of the confidential printing job (S520).

The password thus established is stored in a storage unit of the printer 2, e.g., the hard disk 24, in a format of the password list. FIG. 14 shows an example of a password list 56. The password list 56 consists of a column 561 for listing the user names of the transmitters of confidential printing jobs, a column 562 for listing the passwords specified for the confidential printing jobs, and a column 563 showing the registration times of the passwords. Registered passwords are deleted from the password list 56 from the registration times after a certain period of time. The password thus established can be stored to the password list 56 either before or after the return transmission of the password to the PC 1.

The process sequence of deleting a password in the printer 2 is not repeated here as it is identical to that described in the first embodiments with reference to FIG. 9.

Figure 15:
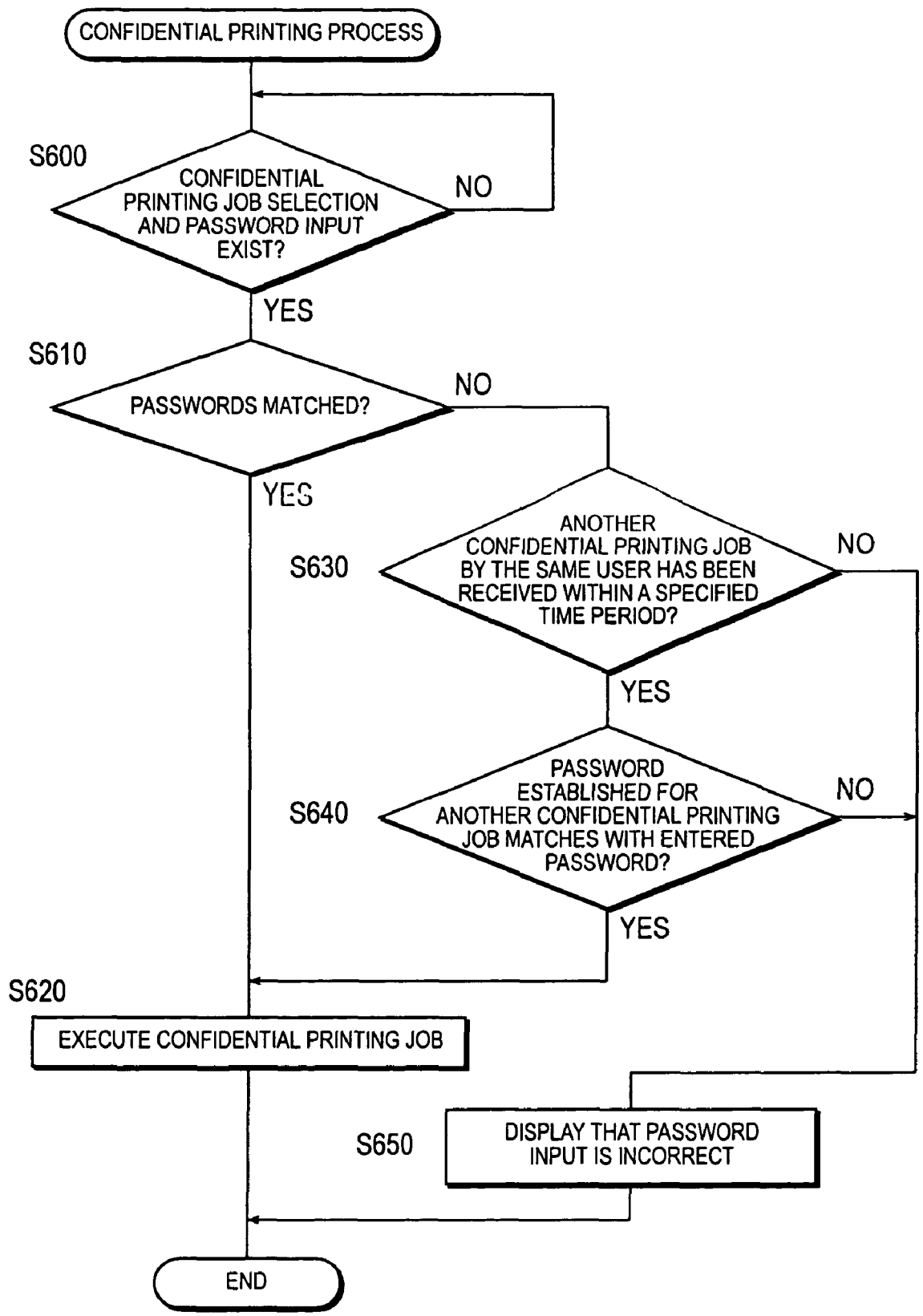
FIG. 15 is a flowchart showing the process sequence of the printer for confidential printing in the second embodiment.

FIG. 15 is a flowchart showing the process sequence of the printer 2 for confidential printing.

First, the printer 2 stands by until a confidential printing job is selected and a password is entered based on the user's operation (S600: No).

Similar to the first embodiment shown in FIG. 11 and FIG. 12, a password is entered on the password entry screen 55 after a job is selected on the printing job selection screen 54.

When the job selection and the password entry are found for a confidential printing job (S600: Yes), a judgment is made as to whether the password established for the selected confidential printing job matches with the entered password or not (S610).

If it is judged that the two passwords match in the step S610 (S610: Yes), the process advances to the step S620. On the other hand, if the two passwords do not match in the step S610 (S610: No), a judgment is made as to whether another confidential printing job by the user related to the selected confidential printing job has been received or not within a specified time period in the past (S630). The specified time period can be established, for example, to approximately one to three hours. The judgment in the step S630 can be done by judging whether the job related to the selected confidential printing job is also the user that corresponds to a user name registered on the password list 56 or not.

If another confidential printing job by the same user has been received within the specified time period (S630: Yes), a judgment is made as to whether the password established for said another confidential printing job matches with the entered password or not (S640). On the other hand, if no other confidential printing job has been received within the specified time period (S630: No), the process advances to the step S650.

If it is judged that the two passwords match in the step S640 (S640: Yes), the process advances to the step S620. On the other hand, if it is judged that the two passwords do not match in the step S640 (S640: No), the process advances to the step S650.

In the step S620, the selected confidential printing job is executed. In other words, the printer 2 allows the confidential printing job to be executed, and the printing unit 26 executes printing based on the selected confidential printing job.

In the step S650, the printer 2 disapproves the execution of the selected confidential printing job and causes the operating panel unit 25 to indicate that the entered password is incorrect.

Next, a case wherein two confidential printing jobs are transmitted to the printer 2 from the PC 1 based on an instruction of confidential printing by the user A. Here we assume that the passwords registered in the password list 56 are maintained for two hours.

First, when the user A instructs the confidential printings at 10:00, the PC 1 transmits the first confidential printing job to the printer 2. The printer 2 receives the first confidential printing job from the PC 1. The printer 2 sends a new password "1234" to the PC 1 and adds to the password list 56 the data consisting of the user name of the user A, the password of "1234," and the registration time of 10:00. As the PC 1 receives the abovementioned response from the printer 2, it displays the password "1234" on the display 15. Furthermore, when the user A instructs another confidential printing at 10:01, the PC 1 transmits the second confidential printing job to the printer 2. The printer 2 receives the second confidential printing job from the PC 1. The printer 2 sends a new password "5678" to the PC 1 and adds to the password list 56 the data consisting of the user name of the user A, the password of "5678," and the registration time of 10:01. As the PC 1 receives the abovementioned response from the printer 2, it displays the password "5678" on the display 15.

Then the user A walks up to the place where the printer 2 is installed at 10:02, selects the first confidential printing job on the operating panel unit 25, and enters "1234" as the password. Because the password established in the selected first confidential job matches with the entered password, the printer 2 approves the execution of the first confidential printing job. Furthermore, the user A selects the second confidential printing job on the operating panel unit 25, and enters "1234" as the password at 10:03. Since the password established for the selected second confidential printing job does not match with the entered password, the printer 2 makes a judgment whether any other confidential printing jobs by the same user exist or not. Since the first confidential printing job exists as another confidential printing job by the same user, a judgment is made as to whether the password established for said first confidential printing job matches or not with the password entered at this time. Because the password established for the other confidential printing job of the same user matches with the password entered at this time, the printer 2 approves the execution of the second confidential printing job.

When the time comes to 12 o'clock, noting that one of the passwords has passed the specified time after its registration, the printer 2 deletes the data consisting of the user name of the user A, the password of "1234," and the registration time of 10:00 from the password list 56. Consequently, when the user A instructs confidential printing again and a third confidential printing job is transmitted to the printer 2, the execution of the third confidential printing job will not be approved even if the user A selects the third confidential printing job and enters "1234" as the password.

Thus, in this embodiment, multiple confidential printing jobs entered by the same user within a specified time period can be executed if either one of the passwords established for the multiple confidential printing jobs is entered at the printer 2.

Therefore, the user is required to remember at least one of the passwords assigned for the multiple confidential printing jobs so that it is possible to minimize the problem of forgetting passwords and being unable to print. Moreover, it is possible to maintain the confidentiality of printed matters as different passwords are established for confidential printing jobs of different users.

Moreover, it can be constituted in such a way as to execute a confidential printing job that corresponds to the entered password by simply entering the password in the password entry screen 55 without displaying the printing job selection screen 54. Further, the registration time on the password list 56 can be updated, for example, when the same user enters the second confidential printing job. By constituting this way, it is more convenient for the user who instructs confidential printing repeatedly in a sequence because the time period, for which the same password is effective, can be extended. Furthermore, it can be so constituted as to leave the registered data on the password list 56 after the specified time has passed, and let the system judge whether there are any other confidential printing jobs by the same user exist whose registration times are within a specified time period based on the time difference between now and then.

Next, an image processing system according to the third embodiment of the invention will be described below. The hardware constitution of this embodiment is similar to that of the image processing system according to the first embodiment shown in FIG. 1 through FIG. 3, so that its description is not repeated here. The following description of the image processing system operation according to the third embodiment therefore focuses on those points which are different from the first embodiment.

Figure 16:
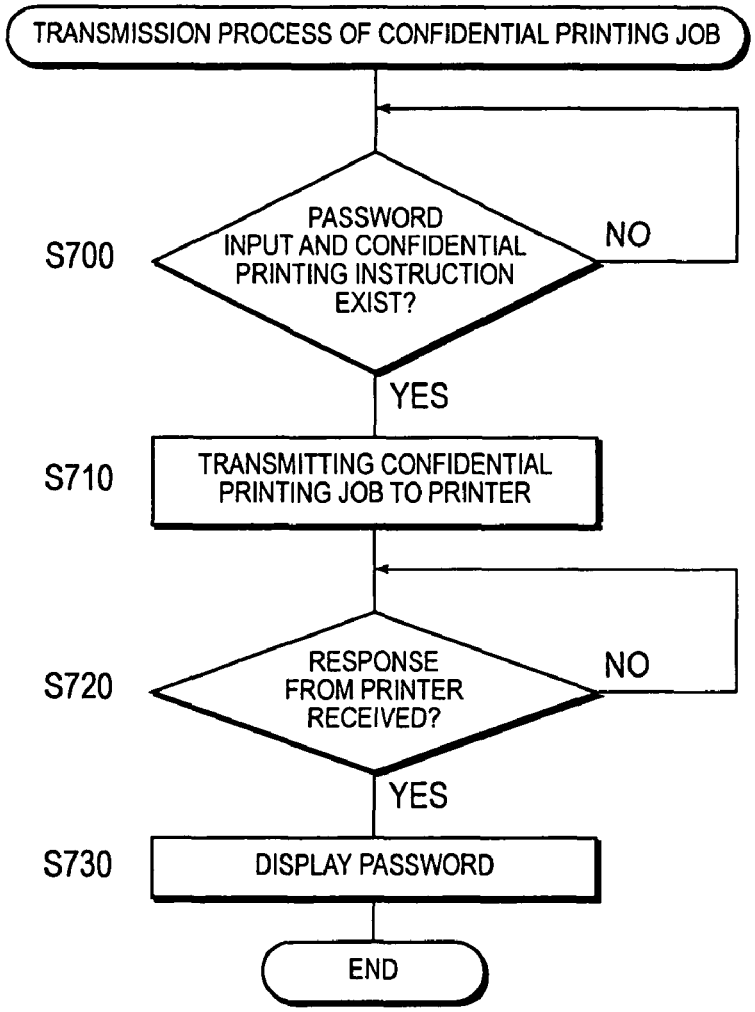
FIG. 16 is a flowchart showing the process sequence of the PC for transmitting a confidential printing job in the third embodiment.

FIG. 16 is a flowchart showing the process sequence of the PC 1 for transmitting a confidential printing job. The algorithm shown in the flowchart of FIG. 16 is stored as a program in a storage unit such as the hard disk 14 of the PC 1 and executed by the CPU 11.

First, the PC 1 will stand by until it receives a password input and an instruction for confidential printing based on the user's operation (S700: No). The confidential printing instruction is issued for a document file generated by the application program.

Figure 17:
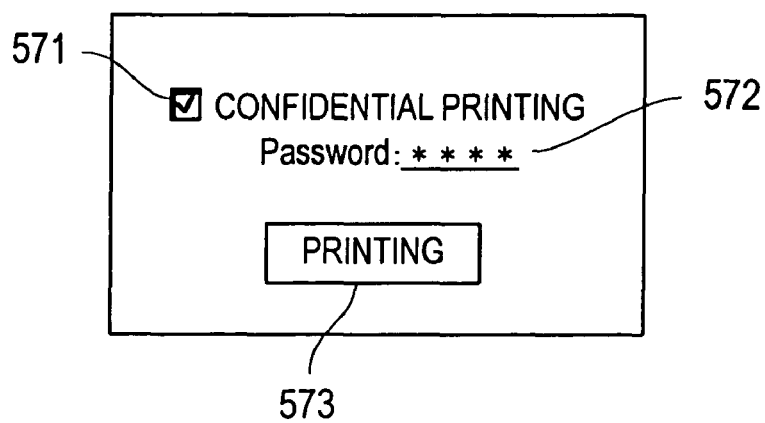
FIG. 17 shows an example of a screen for entering a password and instructing confidential printing.

FIG. 17 shows an example of a screen for entering a password and instructing confidential printing. The entering of the password and the instruction of confidential printing are completed by check-marking a confidential printing check box 571, entering a password in an input area 572, and pressing a printing button 573 on a confidential printing instruction screen 57 displayed by the printer driver.

When the password input and the confidential printing instruction are made (S700: Yes), a confidential printing job including print data converted by the printer driver is generated and said printing job is transmitted to the printer 2 (S710).

Next, the PC 1 stands by until it receives a response from the printer 2 (S720: No). Such a response includes a password for executing on the printer 2 the confidential printing job transmitted in the step S710.

When a response is received from the printer 2 (S720: Yes), the PC1 displays the password included in the received response on the display 15 (S730).

Figures 18, 19:
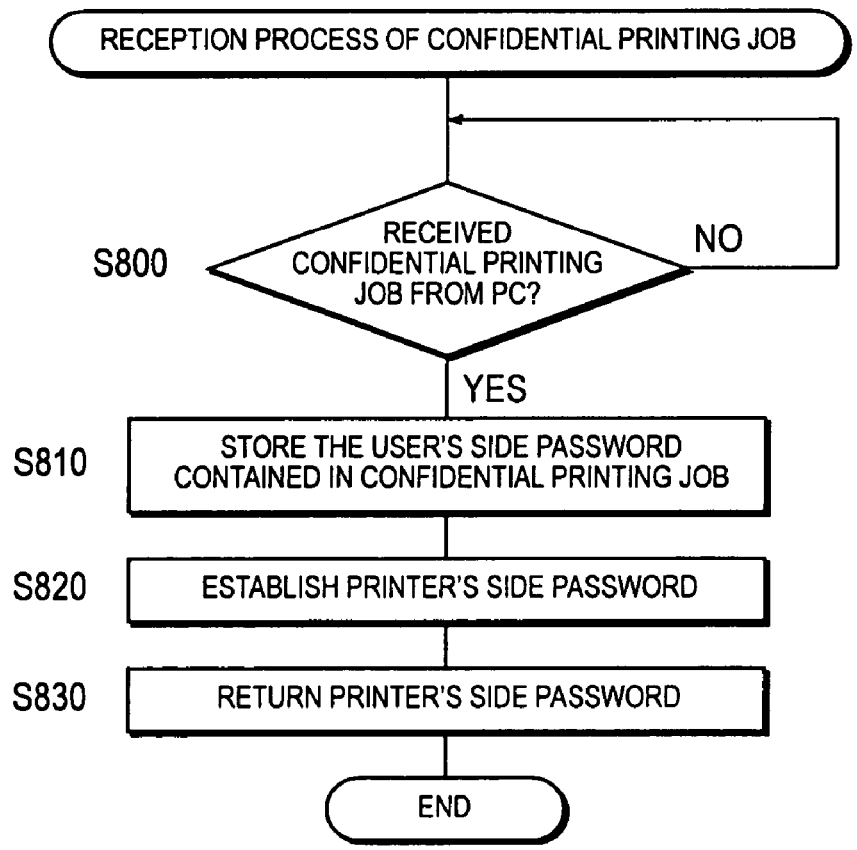
FIG. 18 is a diagram showing an example of a password display screen.
FIG. 19 is a flowchart showing the process sequence of the printer for receiving a confidential printing job in the third embodiment.

FIG. 18 is a diagram showing an example of a password display screen 58. The password display screen 58 contains a display area 581 for the user's side password specified by the user and a display area 582 for the printer's side password, which is different from the user's side password. The printer's side password is established by the printer 2 as described later. The display area 581 for the user's side password can be omitted if so wished.

FIG. 19 is a flowchart showing the process sequence of the printer 2 for receiving a confidential printing job. The algorithm shown in the flowchart of FIG. 19 is stored as a program in a storage unit such as the ROM 22 of the printer 2 and executed by the CPU 21 (the same thing goes with the algorithm shown in FIG. 21 which will be described later)

First, the printer 2 stands by until it receives a confidential printing job from the PC 1 (S800: No).

If a confidential printing job is received from the PC 1 (S800: Yes), the user's side password contained in said confidential printing job is stored (S810).

Next, a printer's side password will be established for the received confidential printing job to be different from the user's side password (S820). The printer's side password here is generated by adding an unrelated code such as a text string to the user's side password specified by the user. The printer's side password can be established so as not to match with the passwords related to other confidential printing jobs. Therefore, the printer's side password can be chosen to be easier to remember for the user and to maintain the confidentiality.

The password established for the received confidential printing job is then returned to the PC 1, which is the sender of said confidential printing job (S830).

The printer's side password thus established is then stored together with the user's side password in a storage unit of the printer 2, e.g., the hard disk 24, in a format of a password list. FIG. 20 shows an example of a password list 59. The password list 59 consists of a column 591 for listing the user names of the transmitters of confidential printing jobs, a column 592 for listing the user's side passwords extracted from received confidential printing jobs, a column 593 for listing the printer's side passwords established for confidential printing jobs, and a column 594 for showing the registration times of the passwords. Registered passwords are deleted from the password list 53 after a certain period of time from the registration times. The printer's side password thus established can be stored to the password list 59 either before or after the return transmission of the password to the PC 1.

The process sequence of deleting a password in the printer 2 is not repeated here as it is identical to that described in the first embodiments with reference to FIG. 9. The registration time on the password list 56 can be updated when a password entry is made on the printer 2.

Figure 21:
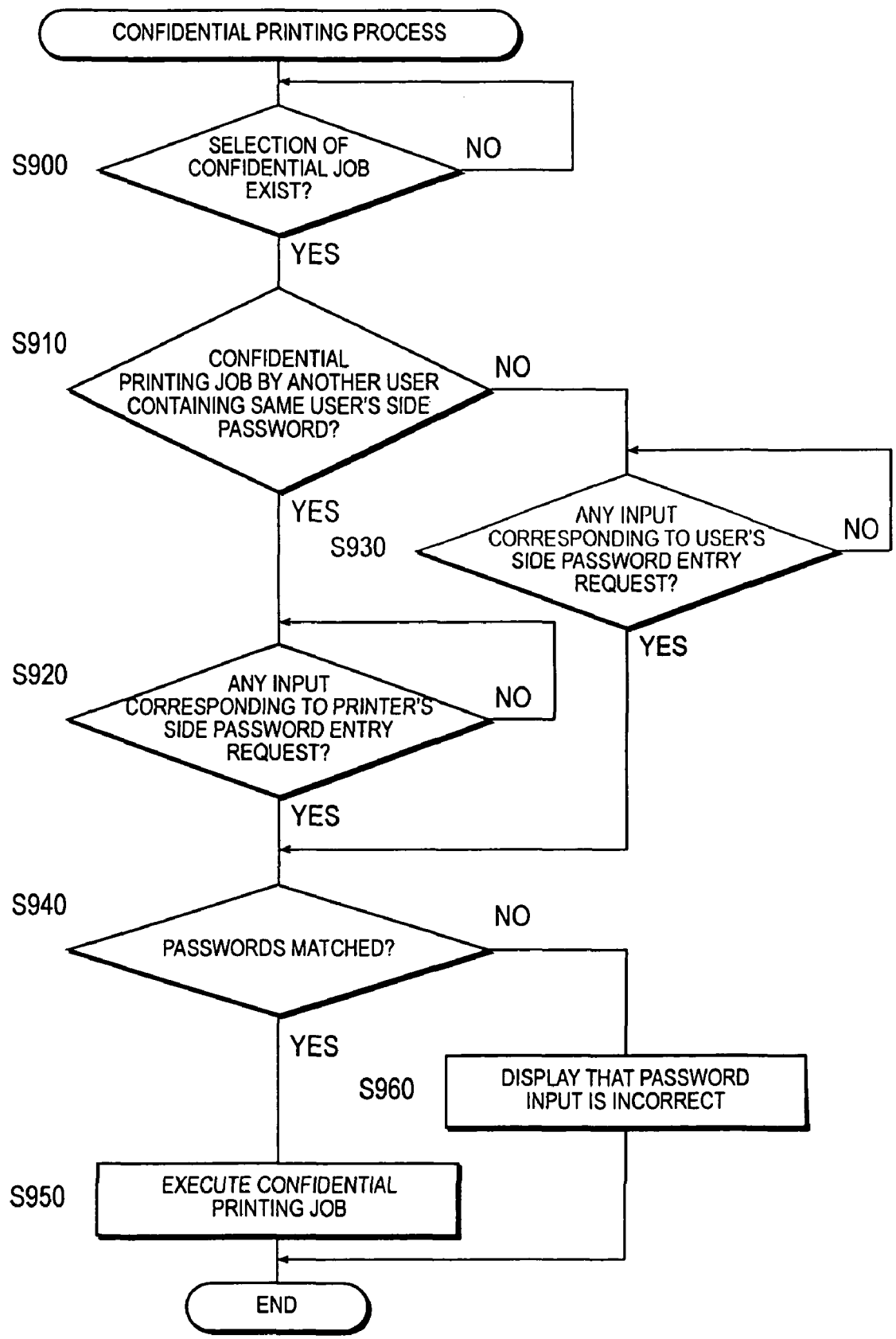
FIG. 21 is a flowchart showing the process sequence of the printer for confidential printing in the third embodiment.

FIG. 21 is a flowchart showing the process sequence of the printer 2 for confidential printing.

First, the printer 2 stands by until a confidential printing job is selected based on the user's operation (S900: No). More specifically, the confidential printing job to be executed is selected on the printing job selection screen 54 displayed on the operating panel unit 25 (see FIG. 11).

When a confidential printing job selection is made (S900: Yes), a judgment is made as to whether another printing job for confidential printing has been received within the specified time period in the past or not, which is by a user different from the user related to the selected printing job and contains the same user's side password as the one contained in the selected printing job (S910). The specified time period can be set up, for example, to approximately one to three hours. The judgment in the step S910 can be done by referencing the password list 59.

If it is judged that another confidential printing job exists in the step S910 (S910: Yes), the printer 2 stands by until an entry is made concerning the input request of the printer's side password (S920: No).

FIG. 22 is a diagram showing a password entry screen 60 prompting an input of the printer's side password. When a password is entered via the ten-key pad and others of the operating panel unit 25 into this password entry screen 60 (S920: Yes), the process advances to the step S940.

On the other hand, if it is judged that no other confidential printing job exists in the step S910 (S910: No), the printer 2 stands by until an entry is made concerning the input request of the printer's side password (S930: No).

FIG. 23 is a diagram showing a password entry screen 61 prompting an input of the user's side password. When a password is entered via the ten-key pad and others of the operating panel unit 25 into this password entry screen 61 (S930: Yes), the process advances to the step S940.

A judgment is made in the step S940 as to whether the password related to the selected confidential printing job matches with the entered password or not. If there is another confidential printing job being by another user and containing the same user's side password, a judgment will be made as to whether the printer's side password matches with the entered password or not, while if there is no other confidential printing job being by another user and containing the same user's side password, a judgment will be made as to whether the user's side password matches with the entered password or not.

When the two passwords match with each other (S940: Yes), the selected confidential printing job is executed (S950). In other words, the printer 2 allows the confidential printing job to be executed, and the printing unit 26 executes printing based on the selected confidential printing job.

On the other hand, if the two passwords do not match (S940: No), the printer 2 disapproves the execution of the selected confidential printing job and causes the operating panel unit 25 to indicate that the entered password is incorrect (S960).

Next, the invention will be described referring to a more specific case. Here we assume that the passwords registered in the password list 59 are maintained for two hours.

First, when the user A instructs confidential printing by entering a user's side password of "1234" at 10:00, the PC 1 transmits a confidential printing job containing a user's side password to the printer 2. Upon receiving the confidential printing job from the PC 1, the printer 2 stores the user's side password and establishes the printer's side password "12345678." The printer 2 then sends the printer's side password "12345678" to the PC 1 and adds to the password list 59 the data consisting of the user name of the user A, the user's side password of "1234," the printer's side password of "12345678," and the registration time of 10:00. As the PC 1 receives the abovementioned response from the printer 2, it displays the printer's side password on the display 15.

When the user B instructs confidential printing by entering "1234" as a user's side password at 10:02, the PC 1 transmits a confidential printing job containing the user's side password to the printer 2. Upon receiving the confidential printing job from the PC 1, the printer 2 stores the user's side password and establishes the printer's side password "12340123." The printer 2 then sends the printer's side password to the PC 1 and adds to the password list 59 the data consisting of the user name of the user B, the user's side password of "1234," the printer's side password of "12340123," and the registration time of 10:02. As the PC 1 receives the abovementioned response from the printer 2, it displays the printer's side password on the display 15.

When the user C instructs confidential printing by entering "9999" as a user's side password at 10:03, the PC 1 transmits a confidential printing job containing the user's side password to the printer 2. Upon receiving the confidential printing job from the PC 1, the printer 2 stores the user's side password and establishes the printer's side password "99991111." The printer 2 then sends the printer's side password to the PC 1 and adds to the password list 59 the data consisting of the user name of the user C, the user's side password of "9999," the printer's side password of "99991111," and the registration time of 10:03. As the PC 1 receives the abovementioned response from the printer 2, it displays the printer's side password on the display 15.

Then the user C walks up to the place where the printer 2 is installed at 10:10, selects the confidential printing job, of which he/she instructed the transmission, on the operating panel unit 25. Since there is no other confidential printing job being by another user and containing the same user's side password (refer to FIG. 20), the printer 2 stands by until a user's side password is entered. Because the user's side password established for the selected confidential printing job matches with the entered password when the password "9999" is entered, the printer 2 approves the execution of the selected confidential printing job.

Then the user A walks up to the place where the printer 2 is installed at 10:11, selects the confidential printing job, of which he/she instructed the transmission, on the operating panel unit 25. Since there is another confidential printing job being by another user and containing the same user's side password (refer to FIG. 20), the printer 2 stands by until a printer's side password is entered. Because the printer's side password established for the selected confidential printing job matches with the entered password when the password "12345678" is entered, the printer 2 approves the execution of the selected confidential printing job. However, if the password "1234" is entered here, the printer's side password established for the selected confidential printing job does not match with the entered password, so that the printer 2 disapproves the execution of the selected confidential printing job and displays that the entered password is incorrect on the display 15. It can also be constituted in such a way as to display a prompt for the entry of the printer's side password again at this time and send the process back to the step S920.

When the time comes to 12 o'clock, noting that one of the passwords has passed the specified time after its registration, the printer 2 deletes the data consisting of the user name of the user A, the user's side password of "1234," the printer's side password of "12345678," and the registration time of 10:00 from the password list 59. Therefore, when the user B walks up to the printer 2 at 12: 01, selects the confidential printing job, which he/she instructed the transmission of, and enters the password "1234," the execution of said confidential printing job will be executed.

As can be seen from the above, the printer 2 approves the execution of a confidential printing job only when the printer's side password established by the printer 2 is entered, when the user's side password specified by the user matches with the one specified by another user. On the other hand, the printer 2 approves the execution of a confidential printing job when the user's side password is entered, when the user's side password specified by the user does not match with the one specified by another user.

Therefore, the user can use the printer's side password established by the printer 2 when the user's side password specified by the user matches with the one specified by another user, while using the user's side password specified by the user him/herself to a maximum extent. This makes it possible for the user to achieve the confidentiality of printed matters while maintaining the user's convenience.

While the printer's side password here is generated by adding an unrelated code such as a text string to the user's side password specified by the user in this embodiment, the invention is not to limited by it. The printer's side password can be entirely different from the user's side password. It is preferable to make the length of the printer's side password longer than the user's side password in order to minimize the possibility of the two passwords accidentally matching.

It is obvious that this invention is not limited to the particular embodiments shown and described above but may be variously changed and modified without departing from the technical concept of this invention.

For example, although a printer is used as the image forming device in the above embodiment, other image forming devices such as a copying machine and MFP (Multi-Function Peripheral) can be used for the same purpose.

Also, although a PC is used as the print data transmission device of the invention in the abovementioned embodiment, the invention is not limited to it and other printing job transmission devices such as a portable terminal can be used for the same purpose.

The means and method of conducting various processes in the image processing system according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a storage unit such as a hard disk. Said program can also be provided as independent application software or can be built into the software of the image processing device as a part of its function.

What is claimed is:

1. An image forming device, comprising: a receiving unit for receiving a first confidential printing job; a first judging unit for judging whether a second confidential printing job by the user related to said first confidential printing job has been received before or not; an establishing unit for establishing by automatically generating a first password for said first confidential printing job after said first confidential printing job is received by the receiving unit, the first password being the same as a second password that has been established for said second confidential printing job, when said second confidential printing job has been received; a second judging unit for judging whether an input password matches with the first password established for said first confidential printing job; and an approving unit for approving the execution of said first confidential printing job if said input password matches with the first password established for said first confidential printing job.

2. An image forming device as claimed in claim 1, wherein said first judging unit judges whether said second confidential printing job has been received within a specified time period or not.

3. An image forming device as claimed in claim 2, further comprising: a deleting unit for deleting said second password, when said second confidential printing job has not been received within a specified time period.

4. An image forming device, comprising:
    a receiving unit for receiving a first confidential printing job;
    an establishing unit for establishing by automatically generating a first password for said first confidential printing job;
    a returning unit for returning the established first password to said first confidential print job's sender;
    a first judging unit for judging whether a second confidential printing job by the user related to said first confidential printing job has been received before or not;
    a second judging unit for judging whether an input password matches with a second password established for said second confidential printing job or not, when said second confidential printing job has been received; and
    an approving unit for approving the execution of said first confidential printing job if said input password matches with the second password.

5. An image forming device as claimed in claim 4, wherein said approving unit approves the execution of said first confidential printing job when said input password matches with the first password or the second password.

6. An image forming device as claimed in claim 4, wherein said first judging unit judges whether said second confidential printing job has been received within a specified time period or not.

7. An image forming device as claimed in claim 6, wherein said approving unit approves the execution of said first confidential printing job when said input password matches with the first password only, if said second confidential printing job has not been received within a specified time period.

8. An image forming device, comprising:
    a receiving unit for receiving a confidential printing job containing a user's side password specified by a user;
    a storage unit for storing the user's side password contained in said confidential printing job;
    an establishing unit for establishing by automatically generating a printer's side password for said confidential printing job different from said user's side password;
    a first judging unit for judging whether another confidential printing job has been received before or not, said another confidential printing job being by a user different from the user related to the received confidential printing job and containing a user's side password same as the one contained in the received confidential printing job;
    a second judging unit for judging whether an input password matches with said printer's side password or not, when said another confidential printing job has been received; and
    an approving unit for approving the execution of said confidential printing job if said input password matches with said printer's side password.

9. An image forming device as claimed in claim 8, further comprising:
    a third judging unit for judging whether the input password matches with said user's side password or not, when said another confidential printing job has not been received; and
    a second approving unit for approving the execution of said confidential printing job if said input password matches with said user's side password.

10. An image forming device as claimed in claim 8, wherein said first judging unit judges whether said another confidential printing job has been received within a specified time period or not.

11. An image forming device as claimed in claim 8, wherein said printer's side password is generated by adding unrelated code to said user's side password.

12. An image forming method comprising:
    1) receiving at an image forming device a first confidential printing job;
    2) judging whether a second confidential printing job by a user related to said first confidential printing job has been received before or not;
    3) establishing by automatically generating a first password for said first confidential printing job at the image forming device after the first confidential printing job is received at the image forming device, the first password being the same as a second password that has been established for said second confidential printing job, when said second job has been received;
    4) returning the established first password to said first print job's sender;
    5) judging whether an input password matches with the first password established for said first confidential printing job; and
    6) approving the execution of said first confidential printing job if said input password matches with the first password established for said first confidential printing job.

13. An image forming method comprising:
    1) receiving at an image forming device a first confidential printing job;
    2) establishing by automatically generating a first password for said first confidential printing job after the first confidential printing job is received at the image forming device;
    3) returning the established first password to said first print job's sender;
    4) judging whether a second confidential printing job by the user related to said first confidential printing job has been received before or not;
    5) judging whether an input password matches with a second password established for said second confidential printing job or not, when said second confidential printing job has been received; and
    6) approving the execution of said first confidential printing job if said input password matches with the second password.

14. An image forming method comprising:
    1) receiving a confidential printing job containing a user's side password specified by a user at a printer;
    2) storing the user's side password contained in said confidential printing job;
    3) establishing by automatically generating a printer's side password for said confidential printing job different from said user's side password at the printer after the confidential printing job is received at the printer;

4) returning the established printer's side password to said confidential printing job's sender;
5) judging whether another confidential printing job has been received before or not, said another confidential printing job being by a user different from the user related to the received confidential printing job and containing a user's side password same as the one contained in the received confidential printing job;
6) judging whether an input password matches with said printer's side password or not, when said another confidential printing job has been received; and
7) approving the execution of said confidential printing job if said input password matches with said printer's side password.

15. An image forming device as claimed in claim 1, wherein said receiving unit receives the first confidential printing job from an external device and the image forming device further comprises a returning unit for returning the established first password to the external device.

16. An image forming device as claimed in claim 4, wherein said receiving unit receives the first confidential printing job from an external device and the image forming device further comprises a returning unit for returning the established first password to the external device.

17. An image forming device as claimed in claim 8, wherein said receiving unit receives the first confidential printing job from an external device and the image forming device further comprises a returning unit for returning the established printer's side password to the external device.

18. An image forming method as claimed in claim 12, wherein the first confidential printing job is received from an external device and the image forming method further comprises returning the established first password to the external device.

19. An image forming method as claimed in claim 13, wherein the first confidential printing job is received from an external device and the image forming method further comprises returning the established first password to the external device.

20. An image forming method as claimed in claim 14, wherein the confidential printing job is received from an external device and the image forming method further comprises returning the established printer's side password to the external device.

21. An image forming device as claimed in claim 4, wherein said first password is different than the second password.

22. An image forming method as claimed in claim 13, wherein said first password is different than the second password.

23. The image forming device of claim 1, wherein the first confidential printing job is received from a printing job transmission device; and said first password is returned to the printing job transmission device to be displayed to the user.

24. An image forming device, comprising:
a receiving unit for receiving a first confidential printing job from a user;
a judging unit for judging whether there is a second confidential printing job previously received by the image forming device from the user that is related to the first confidential printing job; and
an establishing unit for automatically creating a password for the first confidential printing job after the first confidential printing lob is received by the receiving unit,
wherein if the judging unit judges that there is the second confidential printing job previously received by the image forming device from the user that is related to the first confidential printing job, the password created for the first confidential printing is the same as a password for the second confidential printing job.

* * * * *